United States Patent
Manadhata

(10) Patent No.: US 10,474,820 B2
(45) Date of Patent: Nov. 12, 2019

(54) DNS BASED INFECTION SCORES

(71) Applicant: HEWLETT PACKARD ENTERPRISE DEVELOPMENT LP, Houston, TX (US)

(72) Inventor: Pratyusa K Manadhata, Princeton, NJ (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 22 days.

(21) Appl. No.: 15/319,539

(22) PCT Filed: Jun. 17, 2014

(86) PCT No.: PCT/US2014/042711
§ 371 (c)(1),
(2) Date: Dec. 16, 2016

(87) PCT Pub. No.: WO2015/195093
PCT Pub. Date: Dec. 23, 2015

(65) Prior Publication Data
US 2017/0323102 A1 Nov. 9, 2017

(51) Int. Cl.
*G06F 21/57* (2013.01)
*G06F 16/435* (2019.01)
(Continued)

(52) U.S. Cl.
CPC ............ *G06F 21/57* (2013.01); *G06F 16/435* (2019.01); *G06F 16/9554* (2019.01);
(Continued)

(58) Field of Classification Search
CPC ....................................................... G06F 21/57
See application file for complete search history.

(56) References Cited

U.S. PATENT DOCUMENTS 7,690,037 B1  3/2010  Hartmann
8,484,727 B2  7/2013  Zaitsev
(Continued)

FOREIGN PATENT DOCUMENTS

CN  103634315 A  3/2014
KR  10-1209509 B1  12/2012
(Continued)

OTHER PUBLICATIONS

"Big Data Analytics for Security Intelligence," Sep. 27, 2013, pp. 1-22, Cloud Security Alliance, Available at: <downloads.cloudsecurityalliance.org/initiatives/bdwg./Big_Data_Analytics_for_Security_Intelligenc.
(Continued)

*Primary Examiner* — Simon P Kanaan
(74) *Attorney, Agent, or Firm* — Hewlett Packard Enterprise Patent Department

(57) ABSTRACT

Systems and methods associated with domain name system (DNS) based infection scores. One example method includes maintaining query profiles for members of a set of clients in a network. The query profiles may be maintained based on DNS queries sent from the members of the set of clients, and on DNS responses received by the members of the set of clients. The method also includes generating infection scores for the members of the set of clients based on their respective query profiles. The method also includes prioritizing a vulnerable member of the set of clients for remedial action. The vulnerable member may be prioritized based on infection scores of members of the set of clients.

20 Claims, 5 Drawing Sheets

US 10,474,820 B2
Page 2

(51) Int. Cl.
   *G06F 16/955* (2019.01)
   *G06F 21/55* (2013.01)
   *H04L 29/06* (2006.01)
   *H04L 29/12* (2006.01)

(52) U.S. Cl.
   CPC .......... *G06F 21/55* (2013.01); *H04L 61/1511* (2013.01); *H04L 63/0236* (2013.01); *H04L 63/101* (2013.01); *H04L 63/1441* (2013.01)

(56) References Cited

U.S. PATENT DOCUMENTS

| | | | |
|---|---|---|---|
| 8,555,385 | B1 | 10/2013 | Bhatkar et al. |
| 8,621,638 | B2 | 12/2013 | Judge et al. |
| 8,635,171 | B1 | 1/2014 | Kennedy |
| 8,676,964 | B2 | 3/2014 | Gopalan et al. |
| 9,294,498 | B1* | 3/2016 | Yampolskiy ........ H04L 63/1433 |
| 9,430,646 | B1 | 8/2016 | Mushtaq et al. |
| 9,467,462 | B2* | 10/2016 | Reves ................ H04L 63/1425 |
| 2006/0212572 | A1 | 9/2006 | Yehuda et al. |
| 2007/0150582 | A1 | 6/2007 | Aaron et al. |
| 2007/0180090 | A1 | 8/2007 | Fleischman et al. |
| 2007/0220607 | A1 | 9/2007 | Sprosts et al. |
| 2007/0261112 | A1 | 11/2007 | Todd et al. |
| 2008/0028463 | A1 | 1/2008 | Dagon et al. |
| 2008/0082662 | A1 | 4/2008 | Dandliker et al. |
| 2008/0313738 | A1 | 12/2008 | Enderby |
| 2010/0057895 | A1 | 3/2010 | Huang |
| 2010/0235915 | A1 | 9/2010 | Memon et al. |
| 2010/0319069 | A1 | 12/2010 | Granstedt et al. |
| 2011/0078309 | A1 | 3/2011 | Bloch et al. |
| 2011/0119100 | A1 | 5/2011 | Ruhl et al. |
| 2011/0282997 | A1* | 11/2011 | Prince ................ H04L 61/1511 709/226 |
| 2012/0030750 | A1 | 2/2012 | Bhargava et al. |
| 2012/0173684 | A1 | 7/2012 | Courtney et al. |
| 2012/0246315 | A1 | 9/2012 | Kagan |
| 2012/0304244 | A1 | 11/2012 | Xie et al. |
| 2013/0031625 | A1 | 1/2013 | Lim |
| 2013/0091387 | A1 | 4/2013 | Bohnet et al. |
| 2013/0283336 | A1 | 10/2013 | Macy et al. |
| 2013/0326625 | A1 | 12/2013 | Anderson et al. |
| 2014/0007238 | A1 | 1/2014 | Magee et al. |
| 2014/0039274 | A1 | 2/2014 | Sarrafzadeh et al. |
| 2014/0041032 | A1 | 2/2014 | Scheper et al. |
| 2014/0101759 | A1 | 4/2014 | Antonakakis et al. |
| 2015/0096024 | A1 | 4/2015 | Haq et al. |
| 2015/0150131 | A1 | 5/2015 | Boutnaru et al. |
| 2017/0046629 | A1 | 2/2017 | Reinecke et al. |
| 2017/0323102 | A1 | 11/2017 | Manadhata |

FOREIGN PATENT DOCUMENTS

| | | |
|---|---|---|
| KR | 10-1223931 B1 | 2/2013 |
| TW | 201233103 A | 8/2012 |
| WO | WO-2012/134563 A2 | 10/2012 |
| WO | WO-2013/082271 A1 | 6/2013 |
| WO | WO-2013/189723 A1 | 12/2013 |
| WO | WO-2015163914 | 10/2015 |
| WO | WO-2015195093 | 12/2015 |

OTHER PUBLICATIONS

"Extending Security Intelligence with Big Data Solutions," Thought Leadership White Paper, Jan. 2013, pp. 1-8, IBM Corporation.
"OpenDNS Integrates Predictive Detection Capabilities Into Cloud-Delivered Web Security Platform," Information Week DarkReading, Jul. 30, 2013, pp. 1-10, UBM Tech, Available at: <darkreading.com/management/opendns-integrates-predictive-detection/240159139>.
"Scrutinizer," Sep. 2013, pp. 1-5, Dell, Inc., Available at: <sonicwall.com/app/projects/file_downloader/document_lib.php?t=DS&id=349&dl=1>.
Aalkhal et al., "DNS Traffic Analysis," CS498 Project Report, May 13, 2013, pp. 1-9.
Brandon Enright, "Tracking Malicious Activity with Passive DNA Query Monitoring," Oct. 17, 2012 pp. 1-6, Cisco Blogs>Security, Cisco.
Brennon D. Thomas et al., "An FPGA-Based System for Detecting Malicious DNS Network Traffic," Feb. 13, 2011, pp. 1-16, Available at: <robobrarian.info/b_pubs/IFIP11-Thomas.pdf>.
Chung-Huang Yang and Kuang-Li Ting, "Fast Deployment of Botnet Detection with Traffic Monitoring," 2009 5th International Conference on Intelligent Information Hiding and Multimedia Signal Processing, pp. 856-860, IEEE Computer Society.
Florian Stoffel et al., "Finding Anomalies in Time-Series Using Visual Correlation for Interactive Root Cause Analysis," Oct. 14, 2013, pp. 1-8, ACM.
International Search Report and Written Opinion, International Application No. PCT/US2014/035483, dated Jul. 27, 2015, pp. 1-8, KIPO.
International Search Report and Written Opinion, International Application No. PCT/US2014/036149, dated Jan. 29, 2015, pp. 1-8, KIPO.
International Search Report and Written Opinion, International Application No. PCT/US2014/042711, dated Feb. 16, 2015, pp. 1-10, KIPO.
J.J. Flores et al., "Hybrid Network Anomaly Detection: Learning HMMs Through Evolutionary Computation," Jul. 16, 2013, pp. 1-28, Available at: <iconceptpress.com/download/paper/11071421221590.pdf>.
Juan J. Flores et al., "Hybrid Network Anomaly Detection: Learning HMMs Through Evolutionary Computation," Jul. 16, 2013, pp. 1-28.
Mohammad Sazzadul Hoque et al., "An Implementation of Intrusion Detection System using Genetic Algorithm," International Journal of Network Security & Its Applications, Mar. 2012, pp. 109-120, vol. 4, No. 2.
Nan Jiang et al., "Identifying Suspicious Activities through DNS Failure Graph Analysis," Jan. 19, 2009, pp. 1-10, Available at: <users.cs.umn.edu/~njiang/papers/icnp10_njiang.pdf>.
Office Action, TW Application No. 104108610, dated Mar. 9, 2016, pp, 1-8, TIPO.
Yang, C-H. et al., "Fast Deployment of Botnet Detection with Trafffic Monitoring," Intelligent Information Hiding and Multimedia Signal Processing, 2009, IIH-MSP'09, Fifth International Conference on, IEEE, 2009, 5 pages.
Demme et al., On the Feasibility of Online Malware Detection with Performance Counters, 2013 (12 pages).
Li, Wei, Using Genetic Algorithm for Network Intrusion Detection, 2004 (9 pages).
Packard, Norman H., A Genetic Learning Algorithm for the Analysis of Complex Data, Jul. 1989 (29 pages).
Sinclair et al., An Application of Machine Learning to Network Intrusion Detection, 2000 (7 pages).
Yang et al., "Fast Deployment of Botnet Detection with Traffic Monitoring", Fifth International Conference on Intelligent Information Hiding and Multimedia Signal Processing, IEEE Computer Society, 2009, pp. 856-860.
Yadav et al., "Winning with DNS Failures: Strategies for Faster Botnet Detection", IInternational Conference on Security and Privacy in Communication Systems, 2011, pp. 446-459.
Yadav et al., "Detecting Algorithmically Generated Malicious Domain Names", Proceedings of the 10th ACM SIGCOMM conference on Internet measurement, 2010, pp. 48-61.
Wikipedia, "Genetic Algorithms", available online at <https://en.wikipedia.org/w/index.php?title=Genetic_algorithm&oldid=605253603>, Apr. 22, 2014, 13 pages.
Napatech, "Intelligent Adapters for Real-Time Network Analysis 1-40 GbE", available online at <https://web.archive.org/web/20140314071812/http://www.napatech.com/products/network_adapters.html>, Mar. 14, 2014, 1 page.
Mitchell, Melanie, "An Introduction to Genetic Algorithms", Cambridge, MA: MIT Press, 1996, 20 pages.
Microsoft, "Windows Sysinternals", available online at <https://docs.microsoft.com/en-gb/sysinternals/>, Dec. 9, 2017, 2 pages.

(56) References Cited

OTHER PUBLICATIONS

Koza, John, "Genetic Programming: On the Programming of Computers by Means of Natural Selection", Cambridge, MA: MIT Press, 1992, 609 pages.
IOActive, "Reversal and Analysis of the Zeus and SpyEye Banking Trojans", Technical White Paper, Jul. 1, 2012, 31 pages.
Goldberg, "Genetic Algorithms in Search, Optimization and Machine Learning", Addison-Wesley Publishing Company, 1989, 6 pages.
Casassa Mont et al., "Threat Analytics and Visualization Solution for Big Security Data", Submitted to TechCon 2014, available online at <https://www.labs.hpe.com/techreports/2016/HPE-2016-98.pdf>, 11 pages.
Candida Ferreira, "Gene Expression Programming: A New Adaptive Algorithm for Solving Problems", Complex Systems, vol. 13, issue 2, 2001, 22 pages.
Bilge et al., "Exposure: Finding Malicious Domains Using Passive DNS Analysis", Proceedings of the Network and Distributed System Security Symposium, NDSS 2011, 17 pages.
Antonakakis et al., "From Throw-Away Traffic to Bots: Detecting the Rise of DGA-Based Malware", Proceedings of the 21st USENIX Security Symposium, Aug. 2012, 16 pages.
Antonakakis et al., "Detecting Malware Domains at the Upper DNS Hierarchy", In Proceedings of The 20th USENIX Security Symposium, San Francisco, Aug. 2011, 17 pages.
McLEAN et al., "How the Cyberattack on Spamhaus Unfolded", The New York Times, available online at <https://archive.nytimes.com/www.nytimes.com/interactive/2013/03/30/technology/how-the-cyberattack-on-spamhaus-unfolded.html?>, Mar. 30, 2013, 2 pages.
"WinPcap", Feb. 13, 2014, available online at <https://webarchive.org/web/20140213154833/https://www.winpcap.org/>, 2 pages.

\* cited by examiner

DNS BASED INFECTION SCORES

BACKGROUND

The domain name system (DNS) is used to translate web addresses (e.g., www.[example].com) into internet protocol (IP) addresses (e.g., 15.201.225.10). For example, when a client seeks to reach a website, the client will send a DNS request identifying the website by its web address to a DNS server. The DNS server will then lookup the web address in a table, and if the address is found in the table, the DNS server will respond with a corresponding IP address. DNS is used in internet communications, including malicious traffic (e.g., traffic related to attacks on enterprises).

BRIEF DESCRIPTION OF THE DRAWINGS

The present application may be more fully appreciated in connection with the following detailed description taken in conjunction with the accompanying drawings.

DETAILED DESCRIPTION

Figure 1:
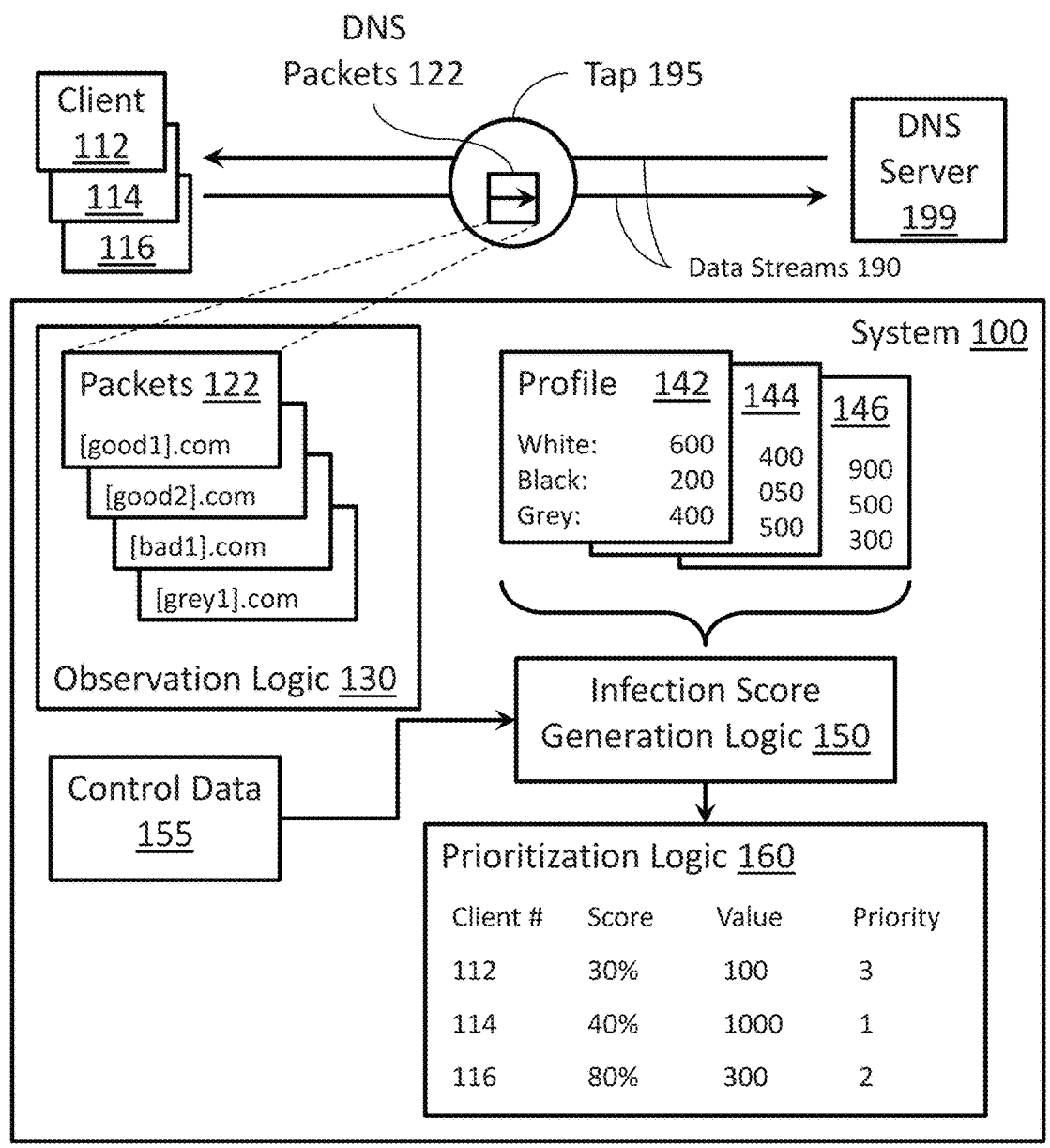
FIG. 1 illustrates an example system associated with DNS based infection scores.

Systems and methods associated with domain name system (DNS) based infection scores are described. FIG. 1 illustrates an example system 100 associated with DNS based infection scores. System 100 may be a system in an enterprise used to identify which of several clients (e.g., client 112, client 114, and client 116) should be prioritized for remediation.

By way of illustration, clients 112, 114, and 116 may belong to a set of clients used by a company in various aspects of the company's business. The clients may include, for example, servers, personal computers assigned to users, and so forth. At any given time, many members of the set of clients may be infected with malware or otherwise compromised from a security perspective. However, due to limited resources of the company's information technology (IT) department, the IT department may be able to remediate issues on a limited number of clients in any given time period. Consequently, the IT department may desire to prioritize for remediation, clients that most need the remediation. Many factors may be taken into account for identifying which clients should be prioritized for remediation including, for example, the severity of infections of various clients, the data and/or user of a client, and so forth.

System 100 includes an observation logic 130. Observation logic may inspect DNS packets (e.g., DNS request packets 122), DNS packets 122 may be retrieved from a data stream 190 between a client (e.g., client 112) and a DNS server 199. FIG. 1 illustrates two data streams 190, including a DNS request stream of DNS request packets sent from clients to DNS server 199 and a DNS response stream of DNS response packets sent from DNS server 199 to clients. To prevent slowdown of traffic in the network, the packet may be copied from a data stream 190 to system 100 by, for example, a network tap 195. In this example, client 112 sent DNS request packets 122 requesting internet protocol (IP) addresses associated with 4 domain names. Additionally, each of these domains may be associated with zero, one, or several internet protocol (IP) addresses. Though DNS request packets having single domain names are shown, there may be situations where a DNS request packet contains several domain names. In this case, data may be tracked for each individual domain contained in a DNS request packet, and for groupings of IP addresses provided in DNS response packets.

In this example, the domain names are categorized as being associated with whitelisted domains (e.g., [good1].com, [good2].com), blacklisted domains (e.g., [bad1].com), and grey domains (e.g., [grey1].com). IP addresses may also be similarly categorized. Whitelisted domains and IP addresses may be known, safe, or assumed safe domains and IP addresses that have a low likelihood of being associated with a malicious event (e.g., a malware attack). Whitelisted domains and IP addresses may be, for example, selected based on a known or assumed list of safe domains and IP addresses, manually selected by an administrator, automatically updated over time based on network traffic, and so forth.

Blacklisted domains and IP addresses may include domains and IP addresses that are known or assumed to be associated with malicious attacks. For example, some malware will communicate with command and control servers to obtain instructions, provide stolen personal information, and so forth. If a client is requesting DNS information associated with a blacklisted domain or receives a DNS response containing a blacklisted IP address, it is likely that the client is infected with an associated malware which can be removed to improve security of the client. Blacklisted domains and IP addresses may be, for example, selected based on a known list of unsafe domains and IP addresses, manually selected by an administrator, automatically updated over time based on network traffic, and so forth.

Grey domains and IP addresses may be, for example, domains and IP addresses that are neither whitelisted nor blacklisted. Because essentially anyone can create a website, and these websites may change ownership over time, it may be difficult to maintain a fully accurate list of which domains and IP addresses are safe and which are unsafe. However, because most legitimate traffic is directed at a small number of domains and IP addresses, these domains and IP addresses may be whitelisted, domains and IP addresses known to be associated with malicious events may be blacklisted, and the remaining domains and IP addresses may be treated as unknown, grey domains.

Because grey domains and IP addresses could be associated with either legitimate traffic or malicious events, a small number of accesses to grey domains may be treated as normal for most clients. However, large numbers of accesses to grey domains may indicate, for example, a misconfiguration of the client, a user of the client accessing inappropriate content, an as of yet unidentified malware on the client, and so forth. In these cases, there may be remedial actions that can be taken to reduce the number of grey domains and/or IP addresses being accessed. These actions may include, for example, reconfiguring a misconfigured client to stop mistakenly accessing grey domains, educating a user, studying and removing a malware, and so forth.

In evaluating how likely a client (e.g., client 112) is infected with a malware, observation logic 130 may inspect DNS request packets (e.g., DNS request packets 122) and DNS response packets and maintain a query profile associated with the client based on contents of the DNS request packets and DNS response packets. In this example, profile 142 is associated with client 112, profile 144 is associated with client 114, and profile 146 is associated with client 116. As mentioned above, DNS request packets 122, which were sent from client 112, contain 2 whitelisted domains, 1 blacklisted domain, and one grey domain. Consequently, Observation logic 130 may update profile 142 based on the numbers of types domains in DNS request packets 122.

Generally, when a client makes many DNS queries associated with blacklisted domains, it is likely that the client is infected by some form of malware. When a client primarily makes DNS queries associated with whitelisted domains, it is likely that the client is secure. When a client makes numerous DNS queries associated with grey domains, the client may be treated as suspicious. Suspicious clients may require further investigation to identify whether the client requires some remedial action.

Though profiles 142, 144, and 146 are only illustrated as tracking numbers of whitelisted, blacklisted, and grey domains from DNS request packets, many other metrics may be tracked within the query profiles. In addition to tracking numbers of various types of domains requested in DNS request packets, query profiles (e.g., profile 142) may track numbers of types of IP addresses received by clients (e.g., client 112) from DNS servers (e.g., DNS server 199) in DNS response packets. These types of IP address may include, for example, blacklisted IP addresses, whitelisted IP addresses, grey IP addresses, and so forth. As with domain names in DNS requests, receiving DNS responses containing blacklisted IP addresses may indicate a client is infected, receiving DNS responses containing whitelisted IP addresses may indicate a client is secure, and receiving DNS responses containing grey IP addresses may indicate a client is suspicious.

Further, numbers of IP addresses received in DNS responses may also be tracked in profiles (e.g., profile 142). By way of illustration, profiles may track how many DNS responses contain zero IP addresses (indicating a domain requested was invalid), how many DNS responses contain a single IP address, and how many DNS responses contain multiple IP addresses.

A large number of DNS responses containing no IP addresses, which are designated by a NXDOMAIN response in the DNS response packet, indicates a high likelihood that the client receiving the NXDOMAIN responses is infected. This may be because, for example some malware algorithmically generate domain names to contact command and control servers, and many of these may fail to resolve. Legitimate websites, on the other end of the spectrum, may respond with multiple IP addresses to facilitate better failover and/or load balancing. Thus, query profiles are likely associated with a healthy client when a query profile indicates a client has received mostly responses with multiple IP addresses.

Responses that contain only a single IP address may be treated as suspicious. Smaller and less popular websites (e.g., serving a niche interest group) may have a single IP address because load-balancing is unnecessary for smaller websites. It is also possible that a DNS request resolving to a single IP address is associated with a malicious website. For example, a phishing site, hosted on a compromised personal computer, may resolve to a single IP address. In one example, it may be possible to predict whether a DNS request resolving to a single IP address is associated with a malicious attack by attempting to re-request the IP address at a later point in time. Because malicious sites are often cleaned up and/or detected and shut down relatively quickly, mappings between domain names and IP addresses associated with these malicious sites may be short lived and/or change regularly. Consequently, if an IP address associated with a domain changes after a predetermined period of time, it may be more likely that the client has accessed a malicious domain.

Derived metrics may also be stored in query profiles. Derived metrics may include, for example, what percentage of requested domains are associated with blacklisted domains and what percentage of received IP addresses are blacklisted IP addresses. This is because a client accessing 80 malicious domains out of 100 queries is likely more in need of remediation than a client accessing 100 malicious domains out of 1000 queries. Additionally, malicious domains and IP addresses may be weighted so that certain types of malicious events are prioritized for remediation. For example, a client having the Zeus worm on it may be considered more in need of remediation than a client having undesirable tracking cookies.

Periodically, the query profiles (e.g., profile 142, profile 144, and profile 146) may be run through an infection score generation logic 150. Infection score generation logic 150 may generate infection scores for each of the clients based on their respective query profiles. In one example, the scores may be generated based on control data 155. Control data 155 may contain data previously retrieved from a set of machines known to be infected and a set of machines known to be free of malware. By comparing query profiles to the control data, clients may be classified based on their levels of infection.

In one example, query profiles and profiles from the control data may be converted to feature vectors to facilitate comparison of the query profiles and the control data. Some techniques for comparing the feature vectors may include, for example, decision trees, logistic regression, support vector machines, and so forth. Depending on the comparison technique applied, different scoring functions may be useful. For example, when using a decision tree to classify clients, a class distribution of a decision node may serve as a scoring function. When using support vector machines, distance of a vector from classification hyperplanes may serve as a scoring function. For regression analysis, the square root of an error metric may serve as the scoring function. In some examples, it may be possible to perform multiple types of classifications which may be useful when the control data contains information regarding multiple types of malware. This may facilitate assigning clients multiple labels based on their query profiles, which can allow clients to be classified as having multiple types of malware. Knowing what types of malware have infected a client may be used for generating infection scores for clients, prioritizing clients for remediation, and recommending a remedial action to take on a client.

In another example, applying clustering techniques to the query profiles may facilitate generating infection scores for the clients. Clusters of control data may be generated, including infected clusters and benign clusters. A query profile may then be compared to the cluster by measuring a distance between a vector generated from the query profile and the cluster. This distance may be measured from, for example, the cluster's centroid, the average distance from all points in the cluster, and so forth. This distance may serve as the scoring function.

Though it may be possible to update a client's infection score by comparing the client's query profile to the control data every time the query profile is updated due to detecting a new DNS request packet or a new DNS response packet associated with the client, this may be inefficient due to performance reasons. Consequently, a time period may be selected for periodically updating infection scores of clients. The time period may be for example, a minute, thirty minutes, an hour, eight hours, a day, and so forth. Selecting a long time period may facilitate building stronger query profiles for the clients. Selecting a shorter time period may reduce the likelihood that a profile may become polluted by, for example, a short burst of malicious traffic followed by a long period of normal use.

Once infection scores have been generated by infection score generation logic 150, the infection scores may then be provided to a prioritization logic 160. Prioritization logic 160 may use the infection scores to rank which client should be prioritized for remediation. The ranking may also be based on how important the various machines are to a company implementing system 100. By way of illustration, a client holding sensitive financial data or belonging to the CEO of the company may be considered more important than a client belonging to a salesperson. In an alternative example, a proxy server may aggregate numerous DNS queries, including queries associated with malicious domains. However, because these queries are likely actually associated with clients other than the proxy server, the proxy server may be given a low priority. Prioritization logic 160 may also take into account, for example, past infection states of clients by examining and/or weighting previous infection scores for the clients.

In this example, a prioritization logic 160 may be illustrated. Client 112, which was given an infection score of 30% by infection score generation logic 150, has a value of 100, client 114 has an infection score of 40% and a value of 1000, and client 116 has an infection score of 80% and a value of 300. In this example, the priorities are ranked by multiplying infection scores by client value, and consequently client 114 has the highest priority for remediation, followed by client 116, and client 112. Thus, in this example, where the infection score generation logic is generating a score indicating a likelihood of infection, client 114 is prioritized for remediation over client 116 because client 114 has a higher value than client 116 despite the fact that client 116 is much more likely to be infected than client 114.

It is appreciated that, in the following description, numerous specific details are set forth to provide a thorough understanding of the examples. However, it is appreciated that the examples may be practiced without limitation to these specific details. In other instances, some methods and structures may not be described in detail to avoid unnecessarily obscuring the description of the examples. Also, the examples may be used in combination with each other.

Figure 2:
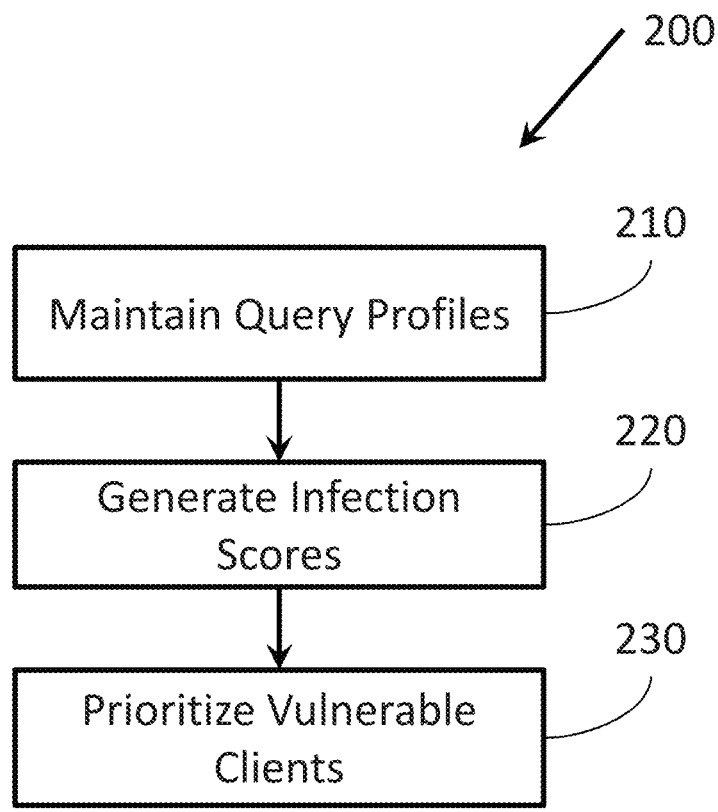
FIG. 2 illustrates an example flowchart of example operations associated with DNS based infection scores.

FIG. 2 illustrates a method 200 associated DNS based infection scores. Method 200 may be, for example, embodied on a non-transitory computer-readable medium storing computer-executable instructions. The instructions, when executed by a computer, may cause the computer to perform method 200.

Method 200 includes maintaining query profiles at 210 for members of a set of clients in a network. The query profiles may be maintained based on domain name system (DNS) queries sent from members of the set of clients. For example, the query profiles may track, for their respective members of the set of clients, quantities of types of domain names requested in DNS queries sent from the members of the set of clients. The types of domain names may include, for example, blacklisted domains, whitelisted domains, grey domains, and so forth.

The query profiles may also be maintained based on DNS responses received by the members of the set of clients. For example, the query profiles may track, for their respective members of the set of clients, quantities of types of Internet protocol (IP) addresses received in DNS responses received by the members of the set of clients. The types of IP addresses received may include, for example, blacklisted IP addresses, whitelisted IP addresses, grey IP addresses, and so forth.

The query profiles may also track, for their respective members of the set of clients, quantities of DNS responses received that contain no IP addresses, quantities of DNS responses received that contain a single IP address, and quantities of DNS responses received that contain multiple IP addresses, and so forth. Here a DNS response refers not to an entire DNS response packet but to a response to an individual DNS request associated with a domain name, as many DNS requests and/or responses may be included in a DNS packet.

The query profiles may also track, for their respective members of the set of clients, derived features of the DNS queries and DNS responses. The derived features may include, for example, a percentage of blacklisted domains requested, a percentage of blacklisted IP addresses received, a weighted score of blacklisted domains requested, a weighted score of blacklisted IP addresses received, and so forth. Weighted scores may be generated based on a metric defining how dangerous certain blacklisted IP addresses are. As some malware may be more likely to compromise, modify, and/or erase sensitive data, these malware may be considered more threatening than a malware that mildly deteriorates client performance. Thus, IP addresses and domains on the blacklist may be weighted to reflect their respective dangerousness to various clients. Tracking weighted scores of blacklisted domains and blacklisted IP addresses may therefore include factoring in the weights of the blacklisted IP addresses and domains into the respective metrics.

Method 200 also includes generating infection scores for members of the set of clients. The infection scores may be generated for members of the set of clients based on their respective query profiles at 220. Generating infection scores may comprise generating feature vectors for members of the set of clients based on their respective query profiles. Generating infection scores may also include comparing the feature vectors to a control set of feature vectors having known infection states. The feature vectors may be compared to the control set of feature vectors using, for example, a decision tree, a logistic regression, clustering, a support vector machine, and so forth.

The comparison may be based on a scoring function that facilitates ranking infection states of members of the set of clients. For example, for a decision tree, a class distribution at various decision nodes may serve as the scoring function. For a support vector machine, the distance of feature vectors from classification hyperplanes may serve as the scoring function. For logistic regressions or other regression techniques, the square root of an error value may serve as the scoring function. For clustering, a distance between a vector and an attribute of a cluster (e.g., a point, a vector, an average) may server as a scoring function.

Method 200 also includes prioritizing a vulnerable member of the set of clients for a remedial action at 230. The prioritization may be based on infection scores of members of the set of clients. In a case where the infection score serves as the priority score, the higher the infection score of a client, the higher the priority that client will be given for remediation.

Prioritizing the vulnerable member of the set of clients may also be based on contents of the members of the set of clients, user identities associated with members of the set of clients, past infection and/or priority states of members of the set of clients and so forth. Prioritizing the vulnerable member based on the contents of the clients and on user identities associated with the clients may ensure that clients having sensitive data and clients assigned to important persons (e.g., a CEO) are more likely to be remediated than less important clients (e.g., a proxy server, a client assigned to a salesperson). In this scenario, clients may therefore be assigned a value V based on their contents, user identities, and so forth. A prioritization value P for a client may be generated by multiplying the client's infection score I by the client's value V. Thus, in some examples, prioritization value P may essentially be a weighted infection score, where the infection score of a client is weighted by a value assigned to the infection score.

Prioritizing the vulnerable client based on past priority scores may be useful because clients that have moderate infection scores over a long period of time may not be otherwise prioritized for a remedial action. Similarly, clients that become infected in the past may become infected again despite remedial action due to, for example, a remedial action being taken that is not sufficient to remedy the infection, or user behavior that should be corrected. Consequently, a client's priority may take into account the priority score of the client associated with the current time period, as well priority scores from the last N time periods, where N is defined by a policy. To ensure that clients that have high priority scores recently are more likely to be prioritized for remedial action, priority scores may be decayed over time. By way of illustration, where $P_k$ represents an priority score from k time periods ago, current priority P taking decay into account may be estimated according to:

$$P = \frac{P_N}{2^N} + \frac{P_{N-1}}{2^{N-1}} + \ldots + \frac{P_1}{2^1} + \frac{P_0}{2^0}. \qquad 1$$

The remedial action may be, for example, removing malware from the vulnerable member of the set of clients. This remedial action may be appropriate when there is an easily removable malware on the vulnerable client. The remedial action may be installing a security application on the vulnerable member of the set of clients. The security application may be for example, a firewall, an antivirus application, an ad-blocker, and so forth. The remedial action may include restoring the vulnerable member of the set of clients to a prior state. This may be required when there is no simple fix to the current state of the vulnerable member of the set of clients but prior states of the vulnerable member were not infected. In even more extreme cases, the remedial action may require replacing the vulnerable member of the set of clients.

Figure 3:
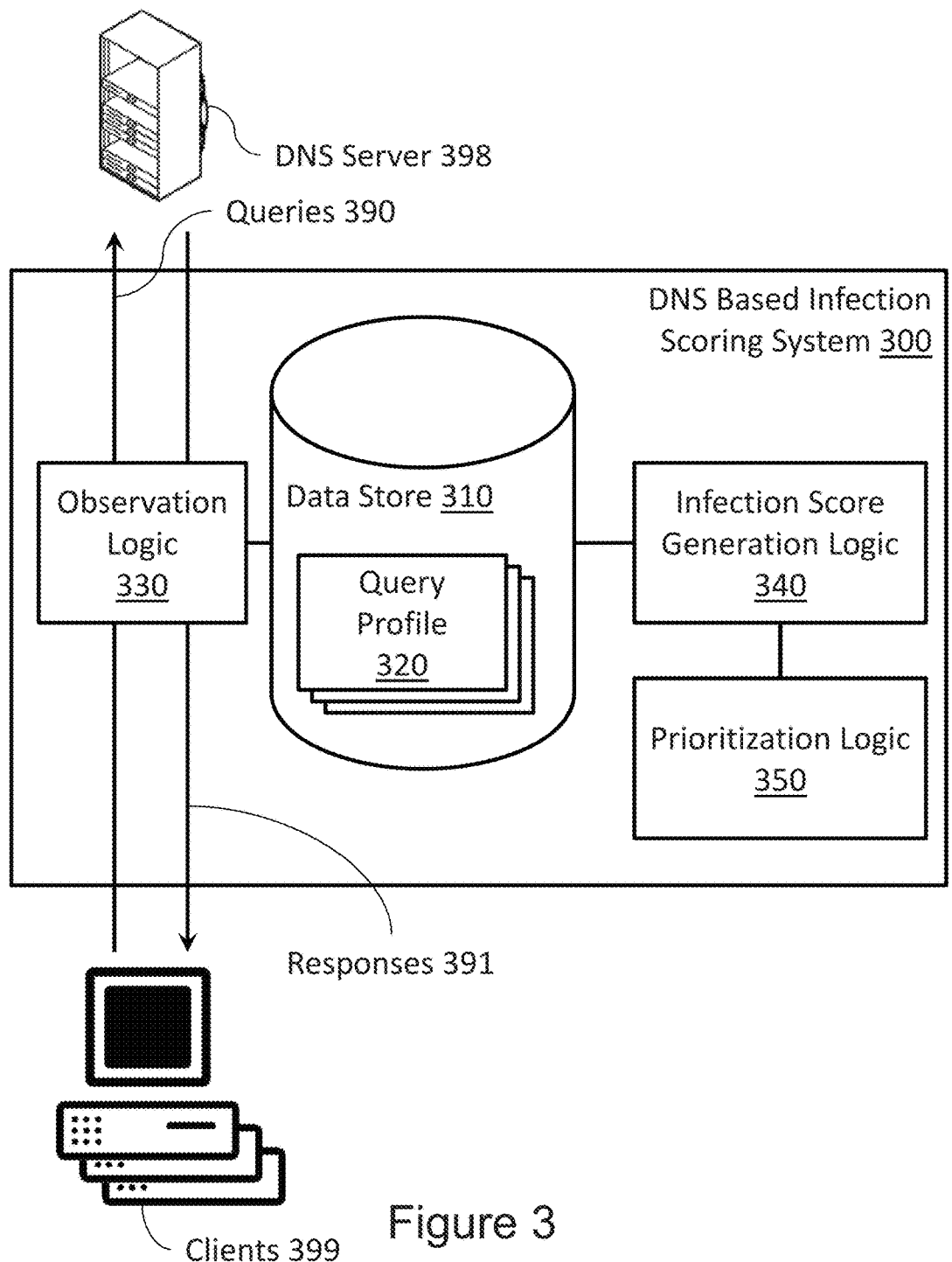
FIG. 3 illustrates an example domain name system (DNS) based infection scoring system.

FIG. 3 illustrates a domain name system (DNS) based infection scoring system 300. DNS based infection scoring system 300 may be incorporated into, for example, an enterprise security management system. DNS based infection scoring system 300 includes a data store 310. Data store 310 may store domain name system (DNS) query profiles 320. DNS query profiles 320 may be associated with members of a set of clients 399. The set of clients may include clients protected by DNS based infection scoring system 300.

DNS based infection scoring system 300 also includes an observation logic 330. Observation logic 330 may perform real time updating of DNS query profiles 320 based on DNS queries 390 and DNS responses 391. DNS queries 390 may be queries that are sent from clients 399 to, for example, a DNS server 398. DNS responses 391 may be responses provided by DNS server 398 to clients 399 in response to DNS queries 390.

DNS based infection scoring system 300 also includes an infection score generation logic 340. Infection score generation logic 340 may generate weighted infection scores for members of the set of clients 399. The infection scores may be generated for members of the set of clients 399 based on their respective DNS query profiles 320.

DNS based infection scoring system 300 also includes a prioritization logic 350. Prioritization logic 350 may cause a remedial action to be performed on a member of the set of clients 399. The member of the set of clients 399 on which the remedial action is performed may be a member of the set of clients having a highest weighted infection score. In one example, prioritization logic 350 may cause the remedial action to be performed by initiating a logic (not shown) to perform the remedial action. In another example, prioritization logic 350 may cause the remedial action to be performed by providing an alert to an administrator identifying the member of the set of clients and the remedial action. Providing the alert may be appropriate instead of initiating a logic to perform the remedial action when the remedial action requires physical access to the machine. There may be other scenarios where it is also desirable to involve an administrator. For example, if the remedial action includes educating a user of the client regarding safe usage behavior, involving a person may make it more likely that educating the user is successful.

Figure 4:
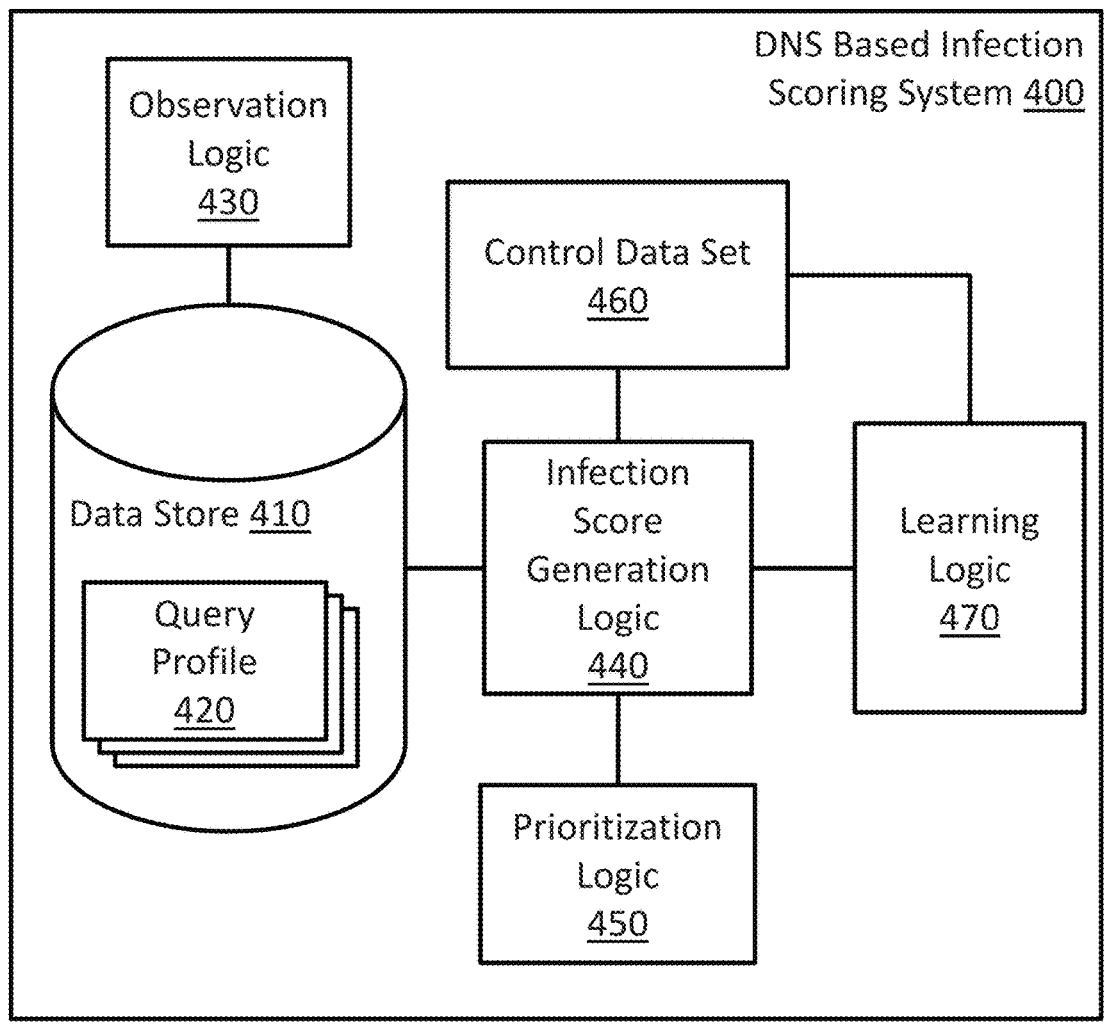
FIG. 4 illustrates another example DNS based infection scoring system associated with DNS based infection scores.

FIG. 4 illustrates a DNS based infection scoring system 400 associated with DNS based infection scores. DNS based infection scoring system 400 contains several items similar to those described with reference to DNS based infection scoring system 300 (FIG. 3). For example, DNS based infection scoring system 400 includes a data store 410 containing DNS query profiles 420 for a set of clients (not shown), an observation logic 430, an infection score generation logic 440, and a prioritization logic 450.

DNS based infection scoring system 400 also includes a control data set 460. Control data set 460 may be used by infection score generation logic 440 when infection score generation logic 440 generates infection scores for members of the set of clients. Specifically, infection score generation logic 440 may compare DNS query profiles 420 to control data set 460 to generate infection scores. DNS query profiles 420 may be compared to control data set 460 using, for example, a decision tree, logistic regression, clustering, a support vector machine, and so forth.

DNS based infection scoring system 400 also includes a learning logic 470. Learning logic 470 may modify control data set 460 over time based on the infection scores. By way of illustration, over time, learning logic 470 may detect certain patterns in infection scores based on certain trends in query profiles. Consequently, if these patterns are recognized as being associated with benign activity, control data set 460 may be updated to reduce the likelihood that benign activity is prioritized for remedial action. Conversely, if patterns in infection scores and query profiles begin to indicate that a certain type of activity is associated with a malicious event, control data set 460 may be updated to increase the likelihood that clients performing the certain type of activity are prioritized for remedial action. The learning logic may also incorporate, for example, input from administrators dispatched to perform remedial actions, data from external logics that seek to track and identify new malicious events, the query profiles and so forth.

Figure 5:
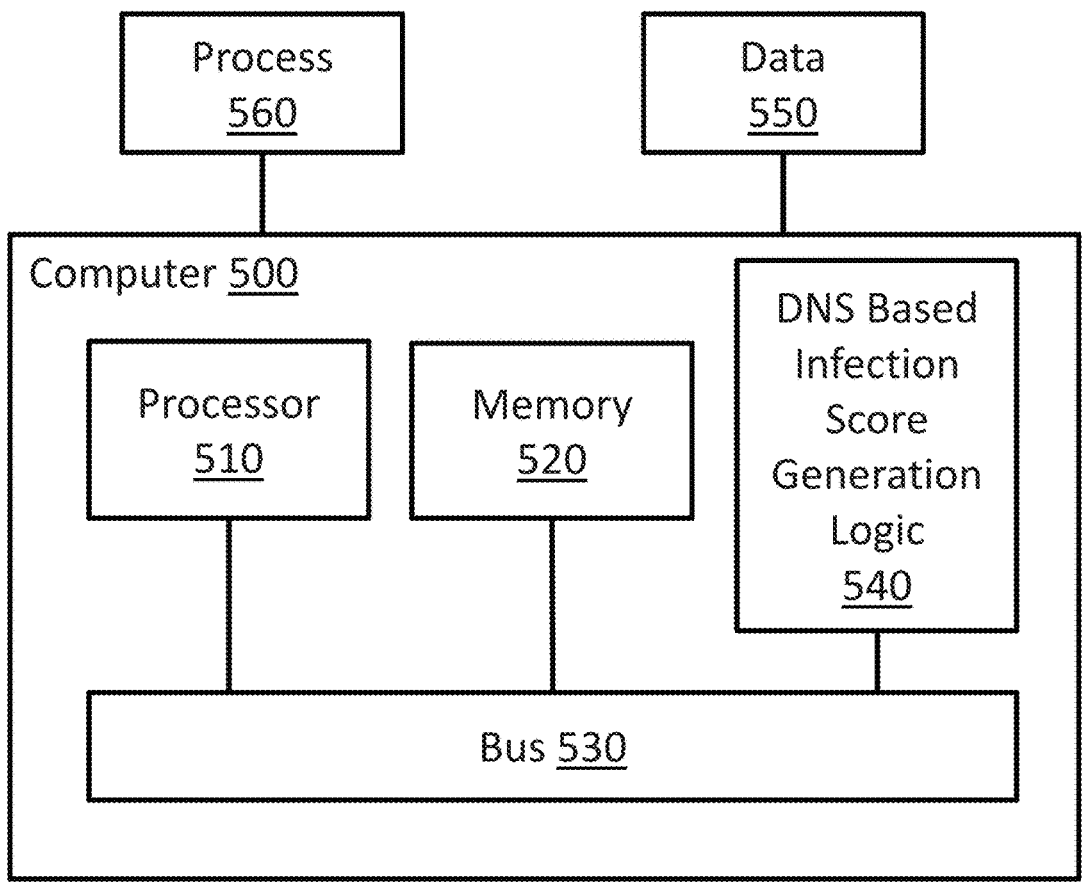
FIG. 5 illustrates an example computing environment in which example systems and methods, and equivalents, may operate.

FIG. 5 illustrates an example computing environment in which example systems and methods, and equivalents, may operate. The example computing device may be a computer 500 that includes a processor 510 and a memory 520 connected by a bus 530. The computer 500 includes a DNS based infection score generation logic 540. In different examples, DNS based infection score generation logic 540 may be implemented as a non-transitory computer-readable medium storing computer-executable instructions in hardware, software, firmware, an application specific integrated circuit, and/or combinations thereof.

The instructions, when executed by computer 500, may cause computer 500 to inspect domain name system (DNS) packets set from a client and received by a client for attributes. The attributes may indicate a suspicion level of the client. The client may be a member of a set of clients in a network protected by computer 500. The instructions may also cause computer 500 to collect the attributes over time into a query profile associated with the client. The instructions may also cause computer 500 to compare the query profile against control profiles to generate an infection score for the client. The instructions may also cause computer 500 to schedule the client for a remedial action when then infection score of the client has a high infection score when compared against infection scores of other members of the set of clients. Whether a client has a high infection score may take into account sensitivity levels of members of the set of clients. The sensitivity levels may be related to, for example, content stored on the client, who uses the client, and so forth.

The instructions may also be presented to computer 500 as data 550 and/or process 560 that are temporarily stored in memory 520 and then executed by processor 510. The processor 510 may be a variety of various processors including dual microprocessor and other multi-processor architectures. Memory 520 may include volatile memory (e.g., read only memory) and/or non-volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:

maintain query profiles for members of a set of clients in a network based on domain name system (DNS) queries sent from the members of the set of clients, wherein the query profiles track, for their respective members of the set of clients, quantities of types of domain names requested in DNS queries sent from the members of the set of clients, wherein the types of domain names include blacklisted domains, whitelisted domains, and grey domains, and wherein the grey domains are not included in the whitelisted domains or the blacklisted domains;

generate infection scores for the members of the set of clients based on their respective query profiles, wherein the infection scores are generated based on quantities of the types of domain names requested in the DNS queries sent from the members of the set of clients; and prioritize a vulnerable member of the set of clients for remedial action based on the infection scores.

2. The non-transitory computer-readable medium of claim 1, wherein the query profiles track, for their respective members of the set of clients, quantities of types of internet protocol (IP) addresses received in DNS responses received by the members of the set of clients, and wherein the types of IP addresses received include blacklisted IP addresses, whitelisted IP addresses, and grey IP addresses.

3. The non-transitory computer-readable medium of claim 1, wherein the query profiles track, for their respective members of the set of clients, quantities of DNS responses received that contain no IP addresses, quantities of DNS responses received that contain a single IP address, and quantities of DNS responses received that contain multiple IP addresses.

4. The non-transitory computer-readable medium of claim 1, wherein the query profiles track, for their respective members of the set of clients, derived features of the DNS queries and DNS responses, wherein the derived features include one or more of, a percentage of blacklisted domains requested, a percentage of blacklisted IP addresses received, a weighted score of blacklisted domains requested, and a weighted score of blacklisted IP addresses received.

5. The non-transitory computer-readable medium of claim 1, wherein the instructions that cause the computer to generate infection scores comprise instructions that cause the computer to:

generate feature vectors for members of the set of clients based on their respective query profiles; and compare the feature vectors to a control set of feature vectors having known infections states.

6. The non-transitory computer-readable medium of claim 5, wherein the feature vectors are compared to the control set of feature vectors using one or more of, a decision tree, a logistic regression, clustering, and a support vector machine.

7. The non-transitory computer-readable medium of claim 1, wherein prioritizing the vulnerable member of the set of clients is also based on one or more of, contents of the members of the set of clients, user identities associated with members of the set of clients, and past infection states of members of the set of clients.

8. The non-transitory computer-readable medium of claim 1, wherein the remedial action comprises one or more of, removing a malware from the vulnerable member of the set of clients, installing a security application on the vulnerable member of the set of clients, restoring the vulnerable member of the set of clients to a prior state, and replacing the vulnerable member of the set of clients.

9. A domain name system (DNS) based infection scoring system, comprising:

at least one processor;

a data store to store DNS query profiles associated with members of a set of clients protected by the DNS based infection scoring system;

non-transitory computer-readable medium storing computer-executable instructions that when executed by the at least one processor cause the system to:

perform real time updating of DNS query profiles based on DNS queries sent from the members of the set of clients, wherein the query profiles track, for their respective members of the set of clients, quantities of types of domain names requested in DNS queries sent from the members of the set of clients, wherein the types of domain names include blacklisted domains, whitelisted domains, and grey domains, and wherein the grey domains are not included in the whitelisted domains or the blacklisted domains;

generate weighted infection scores for the members of the set of clients based on their respective DNS query profiles, wherein the infection scores are generated based on quantities of the types of domain names requested in DNS queries sent from the members of the set of clients; and cause a remedial action to be performed on the member of the set of clients having a highest weighted infection score.

10. The DNS based infection scoring system of claim 9, wherein the remedial action includes providing an alert to an administrator identifying the member of the set of clients and the remedial action.

11. The DNS based infection scoring system of claim 9, further comprising a control data set against which DNS query profiles are compared when generating infection scores for the members of the set of clients.

12. The DNS based infection scoring system of claim 11, wherein the instructions when executed by the processor cause the system to modify the control data set over time based on the infection scores.

13. The DNS based infection scoring system of claim 12, wherein the instructions when executed by the processor cause the system to modify the control data set over time based on one or more of, input from administrators, and the query profiles.

14. A method for a computer, comprising:

inspecting domain name system (DNS) packets sent from a client, wherein the client is a member of a set of clients in a network protected by the computer;

collecting the attributes over time into a query profile associated with the client, wherein the query profiles track, for their respective members of the set of clients, quantities of types of domain names requested in DNS queries sent from the members of the set of clients, wherein the types of domain names include blacklisted domains, whitelisted domains, and grey domains, and wherein the grey domains are not included in the whitelisted domains or the blacklisted domains;

comparing the query profile against control profiles to generate an infection score for the client, wherein the infection score is generated based on quantities of the types of domain names requested in DNS queries sent from the client; and scheduling the client for a remedial action when the client has a high infection score, when compared against infection scores of other members of the set of clients.

15. The non-transitory computer-readable medium of claim 1, wherein the grey domains are domains that are not among the blacklisted domains or the whitelisted domains.

16. The DNS based infection scoring system of claim 9, wherein the grey domains are domains that are not among the blacklisted domains or the whitelisted domains.

17. The method of claim 14, wherein the grey domains are domains that are not among the blacklisted domains or the whitelisted domains.

18. The DNS based infection scoring system of claim 9, wherein the DNS query profiles track, for their respective members of the set of clients, quantities of types of internet protocol (IP) addresses received in DNS responses received by the members of the set of clients, and wherein the types of IP addresses received include blacklisted IP addresses, whitelisted IP addresses, and grey IP addresses.

19. The DNS based infection scoring system of claim 9, wherein the DNS query profiles track, for their respective members of the set of clients, quantities of DNS responses received that contain no IP addresses, quantities of DNS responses received that contain a single IP address, and quantities of DNS responses received that contain multiple IP addresses.

20. The method of claim 14, wherein the query profile tracks, for the client, quantities of types of internet protocol (IP) addresses received in DNS responses received by the client, and wherein the types of IP addresses received include blacklisted IP addresses, whitelisted IP addresses, and grey IP addresses.

* * * * *